United States Patent [19]
Moran et al.

[11] Patent Number: 5,861,886
[45] Date of Patent: Jan. 19, 1999

[54] METHOD AND APPARATUS FOR GROUPING GRAPHIC OBJECTS ON A COMPUTER BASED SYSTEM HAVING A GRAPHICAL USER INTERFACE

[75] Inventors: Thomas P. Moran, Palo Alto; Patrick Chiu, Menlo Park; William J. van Melle, Los Altos, all of Calif.; Gordon P. Kurtenbach, Toronto, Canada

[73] Assignee: Xerox Corporation, Stamford, Conn.

[21] Appl. No.: 670,915

[22] Filed: Jun. 26, 1996

[51] Int. Cl.⁶ ....................................................... G06F 3/00
[52] U.S. Cl. ............................................ 345/358; 345/179
[58] Field of Search ................................... 395/348, 333, 395/334, 335, 339, 357, 358; 345/339, 348, 349, 358, 173, 179, 180, 181, 182, 183, 184

[56] References Cited

U.S. PATENT DOCUMENTS

| | | | |
|---|---|---|---|
| 5,347,295 | 9/1994 | Agulnick et al. | 345/156 |
| 5,471,578 | 11/1995 | Moran et al. | 345/358 |
| 5,509,114 | 4/1996 | Moran et al. | 345/443 |
| 5,572,651 | 11/1996 | Weber et al. | 345/326 |
| 5,583,946 | 12/1996 | Gourdol | 382/187 |

OTHER PUBLICATIONS

"Mac Draw" Claris Corporation, 1988, pp. 29–39.
Wolf, C. G., "The Use of Handwritten Gestures For Text Editing." Int. J. Man—Machines Studies, (1987) 27, 91–102.

*Primary Examiner*—A. Katbab
*Attorney, Agent, or Firm*—Richard B. Dominu

[57] ABSTRACT

A system for creating and manipulating groups of graphic objects using enclosures. A persistent graphic object, such as a closed loop is drawn around a set of graphic objects as an enclosure. When the enclosure is selected the enclosure and the set of graphic objects within are grouped. Besides moving graphic objects into and out of the enclosure, the contents of a group can then be modified by 1) graphically altering the enclosure loop to include or remove graphic objects, 2) fusing groups by moving one of them so that their enclosure loops overlap (i.e., they "fuse" into one), 3) fusing groups through gestures which "touch" enclosure loops of the groups to be fused or 4) splitting the group into multiple groups through a splitting gesture.

18 Claims, 11 Drawing Sheets

METHOD AND APPARATUS FOR GROUPING GRAPHIC OBJECTS ON A COMPUTER BASED SYSTEM HAVING A GRAPHICAL USER INTERFACE

FIELD OF THE INVENTION

The present invention is related to the field of operating in a graphics based computer system, and in particular to defining collections of displayed graphic objects in said graphics based computer system.

BACKGROUND OF THE INVENTION

Computer based systems such as pen based systems and "electronic whiteboards" (e.g. the LiveBoard™ available from LiveWorks a division of Xerox Corporation), provide graphical user interfaces based on utilization of an input device such as a pen, stylus or a cursor control device. In such systems the "display" acts as both a means for showing data and as an input medium. Graphic objects may be "drawn" on the display via pen strokes created using the input device. The graphic objects may represent words, figures or anything that can be displayed. Various operations can then be performed on the graphic objects using an input technique known as gestures. Gestures are themselves merely pen strokes which are interpreted as instructions. Sometimes, such systems will have a draw mode of operation and a gesture mode of operation to distinguish when a pen stroke creates a persistent graphic object or when the pen stroke is treated as a gesture.

When interacting with a computer based system, stopping the thought process in order to wait for operations, e.g. to group or rearrange graphic objects, has a very detrimental effect. Such stoppages generally slow the creative processes. This is of particular impact to the synergy of the group interactions. Artificial delays may cause participants to "lose their train of thought" resulting in the possible loss of ideas. Thus, there is a general need in systems with graphical user interfaces for techniques that provide intuitive and quick manipulation of graphic objects.

Electronic whiteboard such as the LiveBoard are typically used in connection with a collaborative activity such as a meeting. When used, graphic objects representing lists, figures, etc. are drawn. A common operation on such a system is for the user to group graphic objects so that operations can be applied to the objects as a single grouped unit (e.g., moving the objects as a group to retain the spatial orientation amongst the members of the group). Such an operation may be performed by a selection gesture, such as encircling the desired graphic objects and performing a grouping operation. The user may later want to change the group, e.g. ungroup the objects to operate on them individually, add or subtract objects from the group, etc.. In a typical graphical user interface, such a grouping operation would be accomplished by a user selecting the group, applying an Ungroup command, reselecting the desired objects, and then applying the Group command on the desired graphic objects. When performed in a dynamic setting such as a meeting, such steps are awkward. Thus, in such systems there is a need for a technique by which groups of graphic objects can be easily altered.

U.S. Pat. No. 5,471,578 entitled "Apparatus and Method For Altering Enclosure Selections In A Gesture Based Input System", hereinafter the '578 patent, which is assigned to the same assignee of the present application describes a graphical editing system which allows a user to modify a selection gesture without having to redraw the entire gesture. The system defines a selection with an enclosure that is treated as an ephemeral graphic object that can be altered, i.e., reshaped by a set of subsequent gestures which allow the user to expand or reduce the size of the enclosure. These alteration gestures activate specified points or portions of the enclosure to control its shape. If a selection enclosure is drawn, it can be altered to include or exclude additional data by drawing a line segment that is detected by its location relative to the selection enclosure as an alteration gesture to reshape the existing enclosure to include the line segment.

Unfortunately, the invention of the '578 patent cannot be directly used to alter a group of graphic objects once a selection is made. This is because the selection enclosure is an ephemeral graphic object that only exists while a selection is in existence.

Another deficiency with operating with groups is that absent a selection, there is no visual indication that graphic objects are capable of being treated as a group. It would be desirable to provide a non intrusive and intuitive means by which to indicate a grouping of graphic objects.

Thus there is a need for means for interacting with groups of graphic objects that is both visually apparent and that is persistent.

Another desirable capability for such graphical user interfaces is to be able to provide persistent visual links between groups. So for example when working with figures such as flow charts or state diagrams, the figures will be modified or moved around. Making the links persistent will simplify updating and editing of the figures.

Yet another constraint of a graphical user interface is the limited display area. While some systems may be "scrollable", e.g. the aforementioned LiveBoard system, in order to obtain more "unwritten" areas, in some instances it is more desirable to merely "hide" or collapse certain information that has already been written. This hidden information may subsequently be recalled when desired. The object is to have more information space available for writing on. For example, when prioritizing a list, when one portion of the list is fixed it may be hidden, wherein more items on the list can then be displayed without having to scroll.

Various means for temporarily "hiding" information are known in the art. In text editing systems various lines of texts may be hidden and represented by a line of dashes or some other symbol. In systems with graphical user interfaces, icons may be used to represent "files", documents or applications. Other systems provide for "zooming" wherein levels of detail in an image can be modified. Flowcharting applications permit "off-page" designators which when selected cause the "off-page" portion of the flowchart to be displayed.

However, none of the foregoing approaches is particularly applicable to the requirements in a computer system having a freeform graphical user interface. Thus, it would be desirable to have a means by which displayed information in a graphics oriented system can be hidden or collapsed and which can be subsequently expanded to reveal all the information which it represents.

SUMMARY

A method and apparatus for organizing graphic objects in a computer system having a graphical user interface is disclosed. The present invention facilitates interaction techniques for organizing graphic objects which minimize disruptions to the creative process. Graphic objects are markings made on a display which represent letters, words, figures, images, icons, or any other object that may be placed on a computer system having a graphical user interface. The present invention is premised on the notion of organizing graphic objects based on an enclosure. An enclosure is itself a graphic object which defines a region. The enclosure may be an encircling loop; a rectangle or even a highlighted area's perimeter. One or more graphic objects may be contained within the region defined by an enclosure.

The enclosure may be moved, altered to add or remove graphic objects, fused with other enclosures or split to create multiple enclosures. Selection of an enclosure causes each of the associated graphic objects to also be selected.

The alteration of an enclosure is accomplished by a first type of gesture whose two endpoints are "close" to the enclosure. This type of gesture can be of any shape but must satisfy the requirement of the endpoints being "close" to the enclosure. Note that "close" is a relative term that is dependent on various systems factors such as display resolution and thickness of the lines being drawn. Other gestures may be used to enlarge or shrink a selected enclosure.

Moving an enclosure is accomplished by selecting the enclosure (which also selects its contents) and then performing a drag operation. Alternatively, a selected enclosure may be moved to the right using a (">") gesture.

The fusing of enclosures may be implicit or explicit. Implicit fusing is accomplished by simply selecting an enclosure and moving it so that it overlaps another enclosure. The two enclosures are then redrawn as a single enclosure to cover all the graphic objects based on the shaped formed by the overlapped enclosures. Explicit fusing is accomplished by an explicit fuse gesture. The resulting enclosure shape will depend on the spatial relationship between the respective enclosures.

The splitting of enclosures is caused by a user performing a splitting gesture. The location where the enclosure will be split depends on where the splitting gesture is performed.

Enclosures may also be linked to establish a visual relationship between enclosures. The links remain attached to an enclosure, so if the enclosure is moved, the link stretches or contracts accordingly. A fusing gesture may also be used which crosses a link and causes the linked enclosures to be fused and the link to be removed.

The present invention has been implemented for use on a computer controlled display system having a graphical user interface and which utilizes an input device which allows a person to draw graphic objects for input. Examples of such systems include pen based systems, systems utilizing "draw" or "paint" type programs, electronic whiteboards or electronic desk surfaces.

DETAILED DESCRIPTION OF THE PREFERRED EMBODIMENT

An improved system for manipulating graphic objects in a graphics based computer system are disclosed. In the description below various details have been omitted, such as the operation of touch screen displays, in order not to obscure the present invention. In other cases, details have been provided, such as the descriptions of a group of graphic objects, which would have been apparent to one of skill in the art, in order to more clearly point and describe the present invention.

The following terms are used in this description and have their indicated meanings:

Graphic Object: Any displayed object in 2D space.

Curve: A one dimensional graphic object created manually by the user (e.g. a pen stroke) or made by other means, such as by a gesture (e.g. rectangle resulting from a "[" gesture) or generated by the system (e.g. borders).

Pen Stroke: An action with a pen which becomes an ink stroke or a gesture.

Ink stroke: A curve that is persistent.

Gesture: A curve made with a pen stroke that is ephemeral and which is interpreted as an action.

Enclosure: An ink stroke that closes on itself and defines a region.

Enclosure Contents: One or more graphic objects positioned within the region defined by an enclosure.

Group: An enclosure plus its contents. A group can behave as a single graphic object, e.g. a tap gesture on its enclosure selects the group.

Selection: A set of graphic objects tagged as being selected.
Selection enclosure: A gesture surrounding some graphic objects. This is the usual way to define a selection.
Link: An ink stroke touching one or two enclosures [i.e. linking them]. An enclosure may also be linked to itself.
Alter: An operation that reshapes an enclosure and potentially the graphic objects it contains.
Split: An operation that takes an enclosure and splits it into two distinct enclosures, each with its own contents.
Fuse: An operation that takes two or more enclosures and combines them into a single enclosure that contains all the objects in the initial enclosures.
Highlighted Area: A contiguous part of a 2D surface, usually highlighted in some graphic manner. It has a perimeter edge, which serves as an enclosure.

Figure 1A:
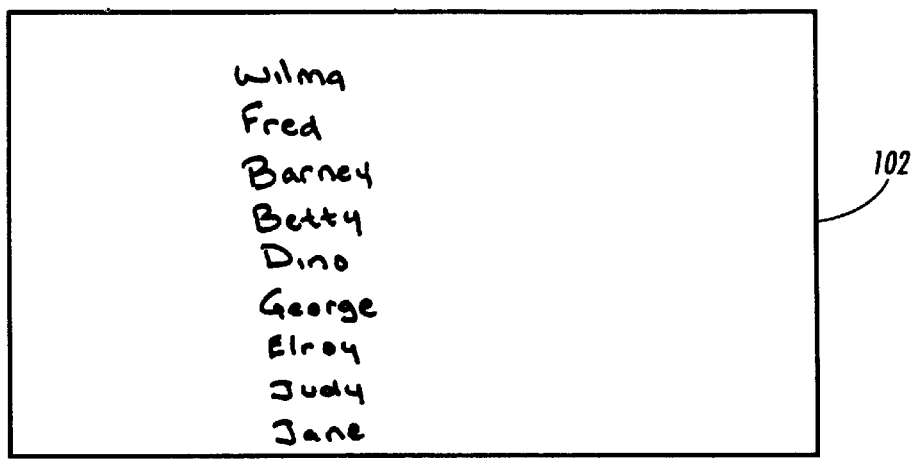
FIGS. 1a–1c illustrate an example of a scenario wherein the currently preferred embodiment of the present invention may be used.
Figure 1B:
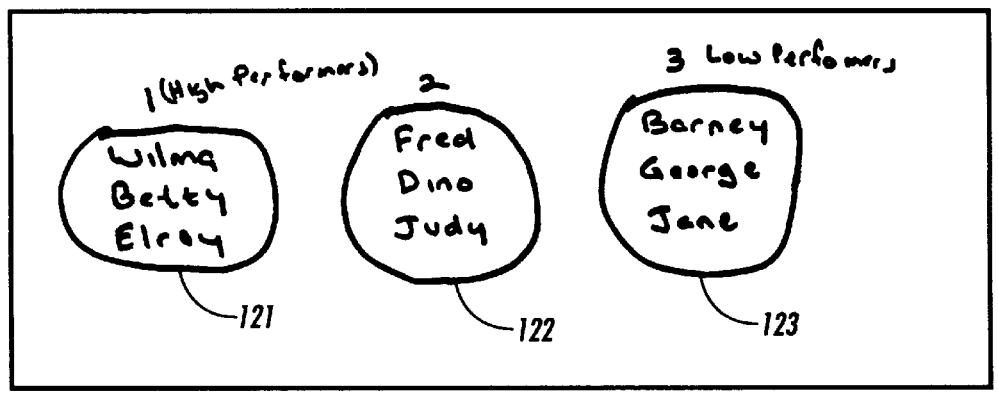
Figure 1C:
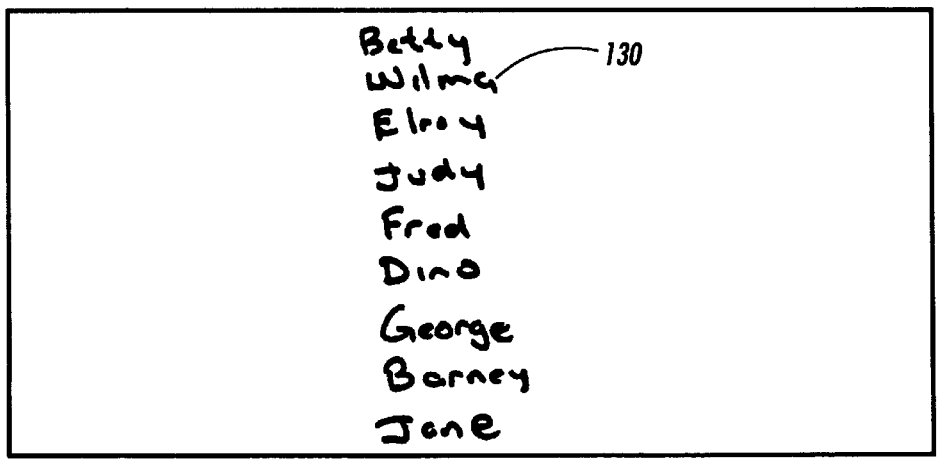

The present invention is useful for any system which manipulates graphic objects, such as drawing programs or pen based systems and the like. The present invention has been found particularly useful in support of collaborative activities such as meetings to rank priorities. In such an activity, users create lists of items and then manipulate the order or the spatial layout of the items. For example, with reference to FIGS. 1a–1c, the ranking of employees is being discussed. The first step is to write down the names of the employees in a list on a visual media that can be viewed by all participants such as a whiteboard. This is illustrated in FIG. 1a as list 101 written on display area 102. A filtering process then occurs where the employees are generally categorized as class 1, 2 or 3 performers and then ranked within a category. This is illustrated in FIG. 1b as class lists 121–123. In a system of the present invention, each of these names is represented by a set of graphic objects (e.g. ink strokes). Thus, the rearrangement of the names is accomplished by select and move operations. Finally, ranking is accomplished within each performance category and fused back together to yield the final ranking list 130 illustrated in FIG. 1c.

There are several important things to observe about this activity. It is critical that users be able to move list items around easily. This suggests that the items (e.g., the names) be grouped, so that they can be dragged as a unit. For example, the performance categories illustrated in FIG. 1b may be moved as a group. But the groups are not fixed; they change throughout the meeting. Items are sometimes put together and implicitly treated as a single unit. Also, annotations may be made on items, perhaps describing the reason for a rating. This annotation should be grouped with the item, e.g., so they move together. It has been determined that it would be useful for users to be able to fuse and split items and make annotations easily as they change their minds concerning the relationships of items or make notes associated with items. Users should also be able to manipulate items within a group independently of other groups.

The currently preferred embodiment of the present invention is a graphical technique for representing and manipulating persistent groupings of graphic objects. The key idea is to indicate groups by explicit enclosures and to allow graphical operations on the enclosures to modify the groups.

Figure 2:
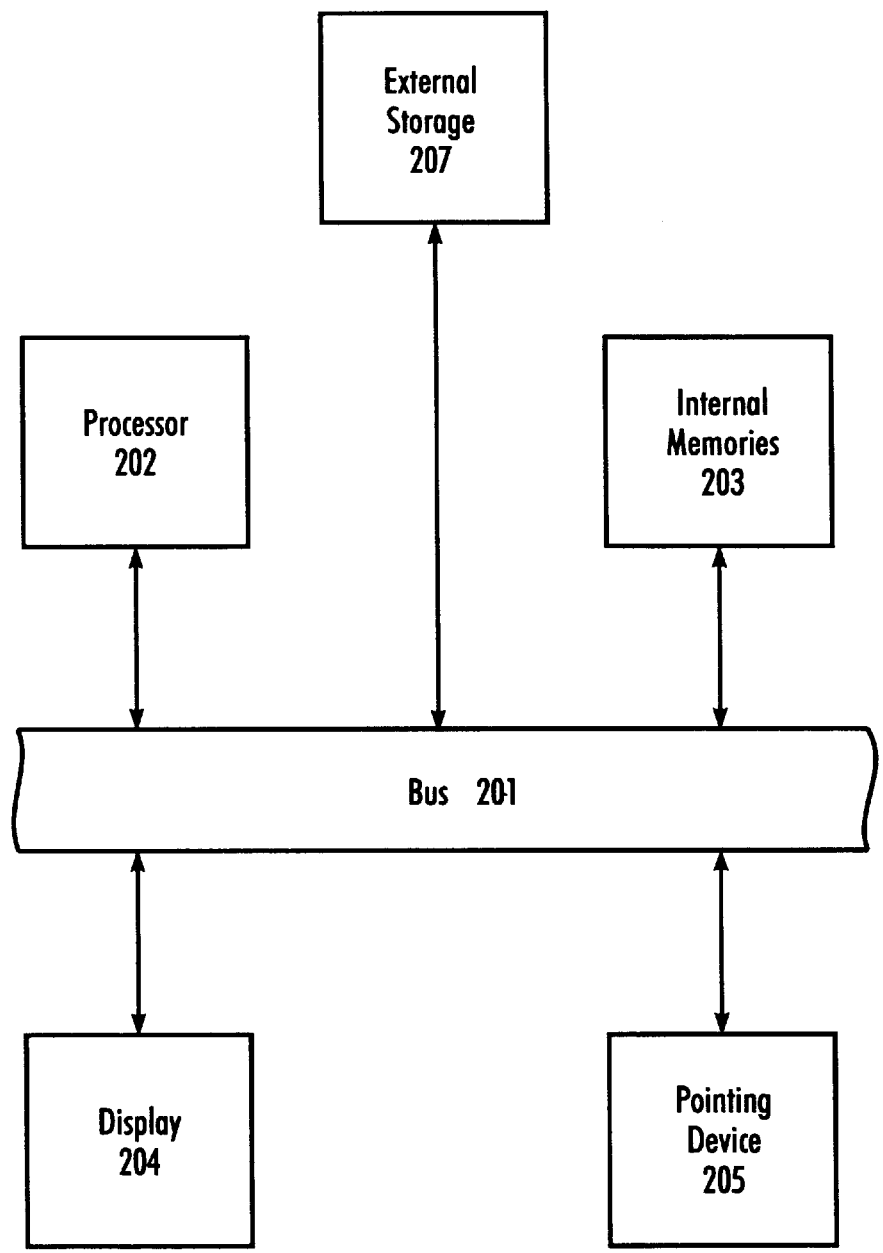
FIG. 2 is a block diagram of a computer based system as may be utilized in the currently preferred embodiment of the present invention.

Overview of the Graphics Based Computer System of the Currently Preferred Embodiment The computer based system as may be utilized in the present invention is illustrated with reference to FIG. 2. Referring to FIG. 2, the computer based system is comprised of a plurality of components coupled via a bus 201. The bus 201 illustrated here is simplified in order not to obscure the present invention. The bus 201 may consist of a plurality of parallel buses (e.g. address, data and status buses) as well as a hierarchy of buses (e.g. a processor bus, a local bus and an I/O bus). In any event, the computer system is further comprised of a processor 202 for executing instructions provided via bus 201 from Internal memory 203 (note that the Internal memory 203 is typically a combination of Random Access or Read Only Memories). When in operation, program instructions for carrying out the various functional components of the present invention are stored in internal memory 203. The processor 202 and Internal memory 203 may be discrete components or a single integrated device. The processor 202 and internal memory 203 comprise circuitry for performing the various processing functions described herein. Also coupled to the bus 201 is external storage 207. The external storage 207 is typically a high capacity storage media such as magnetic or optical disk storage.

Also coupled to the bus 201 is a display 204 and a pointing device 205. In the currently preferred embodiment, the pointing device 205 is a pen driven touch sensitive panel which is integrated with the display 204 as a touch screen display. Such touch screen displays are well known in the art and are utilized in such systems as Pen based system and for electronic whiteboard systems. However, the pointing device 205 and display 204 need not be integrated so that the pointing device 205 may also be a stylus, mouse, track-ball or other cursor control device.

Figure 3:
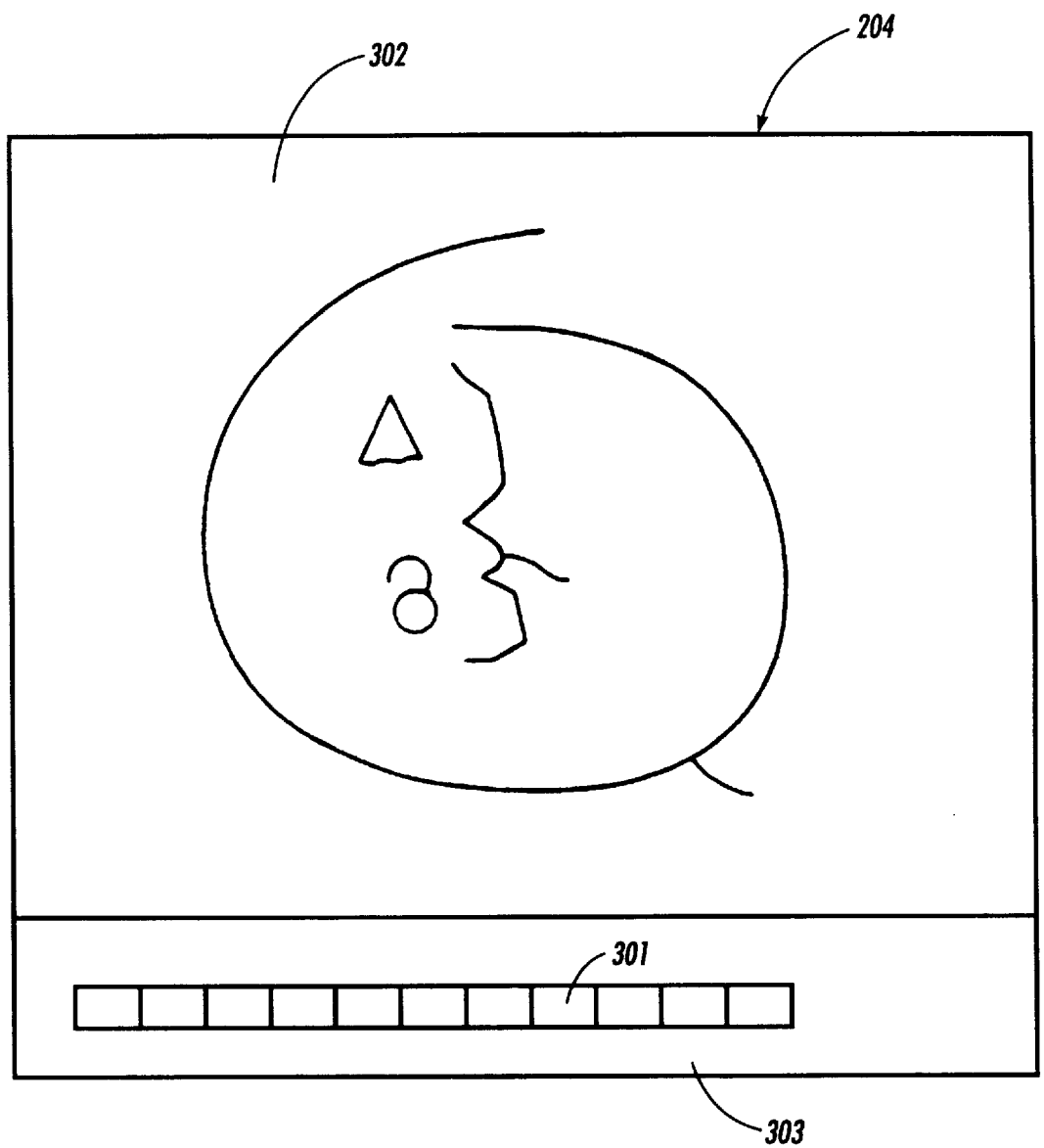
FIG. 3 is a representation of a basic graphical user interface and as may be displayed on the display and interfaced through the touch sensitive panel of FIG. 2.

FIG. 3 illustrates a particular implementation of a graphical user interface as may be used in the present invention. Referring to FIG. 3, the graphical user interface is displayed on display 204 and interacted with via touch panel 205. The graphical user interface employs a working surface and may employ a plurality of accessible functions 301 as is shown. The working surface 302 is where a user may draw various curves and where other graphic objects are displayed. The accessible functions 301 are positioned at the button area 303 of the display. The functions 301 may include operations for editing graphic objects (create, delete, move, shrink, etc.) or changing the operating mode of the touch panel 203 (e.g. switching from draw and gesture mode).

These functions may alternatively be accessed by a pull down menus that are commonly found in Windows oriented applications. These functions however are optional in designation, their principal objects being to define operations which are inherent in the operation of the system. These functions may perform the same functions that are invoked by gestures.

The currently preferred embodiment of the present invention is implemented on a pen based system having a Graphical User Interface (GUI). Such a GUI will typically support operations such as "tap" for selecting/deselecting a graphic object or "double tap" for invoking an operation that may be associated with the graphic object being tapped on. Once an object is selected it may be dragged and dropped to a desired location in the work space.

The work space of the currently preferred embodiment is of a free form so that graphic objects are generally independent of other graphic objects and graphic objects may have an arbitrary organization. This is consistent with how a whiteboard is used. However, to facilitate user operation of the work surface, the notion of implicit structures (hereinafter "structures") are supported. Various types of structures supported in the currently preferred embodiment and are described in EPA 0 667 567 A2, entitled "Apparatus and Method For Supporting the Inplicit Structure of Free-form Lists, Outlines, Text, Tables, and Diagrams In A Gesture-Based Input System and Editing System", which is assigned to the same assignee of the present application. Conceptually a structure is a collection of graphic objects which have a particular relationship, e.g. a list of items. When a structure operation occurs the relationship amongst the items is retained. For example, when an item is entered into the middle of a list, the items below the place of insertion are moved down in order to make room for the inserted item.

The currently preferred embodiment of the present invention has been implemented as software programs in the C++ programming language, for use on a pen based system, such as the LiveBoard, running under the control of a suitable whiteboard emulation program.

Manipulation of Groups Of Graphic Objects

Figure 4:
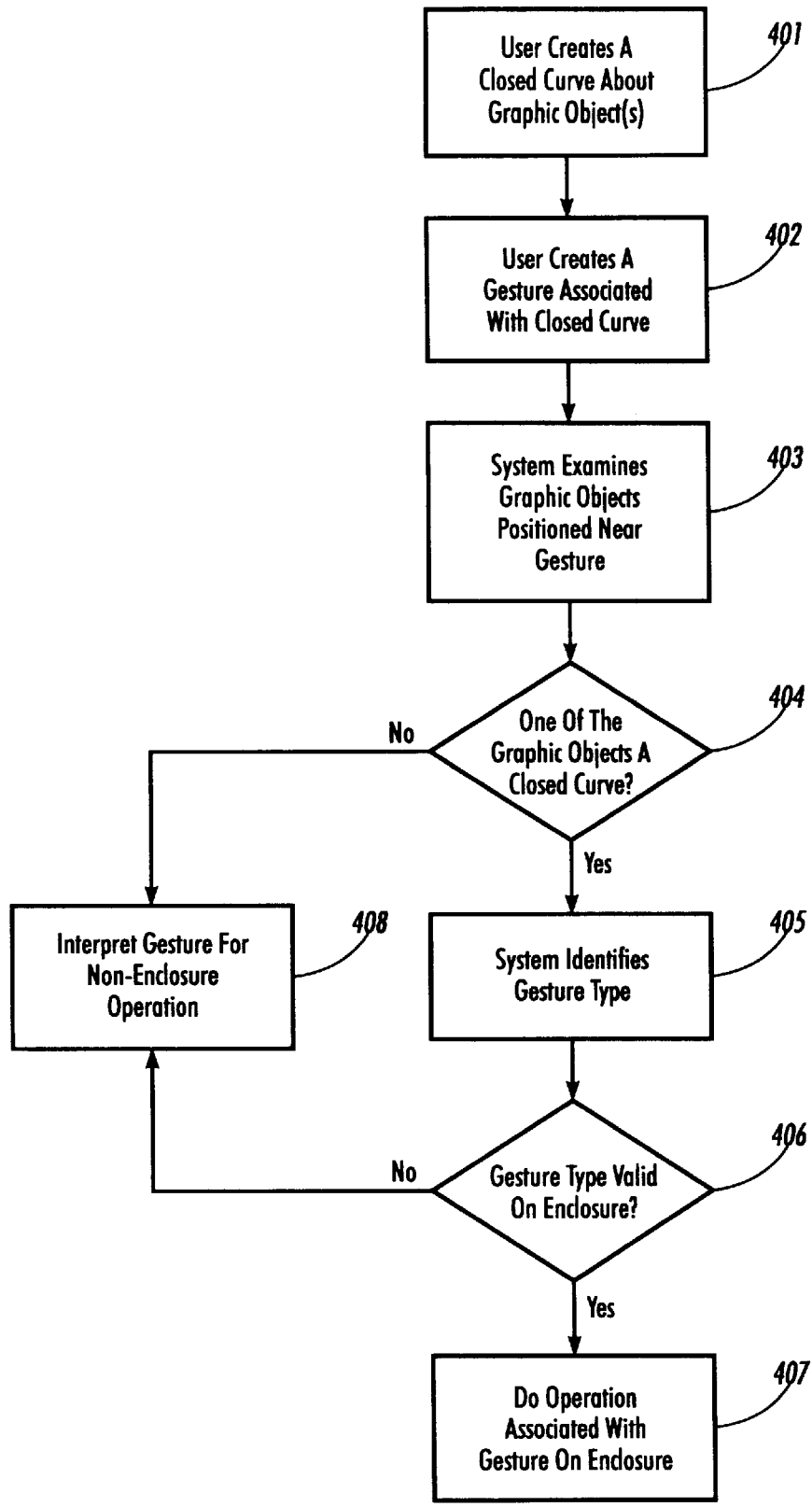
FIG. 4 is a flow diagram illustrating the basic user interface operation of a graphics based system as may be utilized in the currently preferred embodiment of the present invention.

The present invention enables various techniques for manipulating groups of graphic objects through alteration of the corresponding enclosure. The flow diagram of FIG. 4 illustrates the basic interaction which may cause an operation in a graphics input system in the currently preferred embodiment. Referring to FIG. 4, during the course of using an electronic whiteboard, a user creates a closed curve, e.g. by gesture or inking, about one or more graphic objects, step 401. This may occur as a result of organizing or rearranging the contents of the electronic whiteboard. After some period of time wherein the user may be performing other operations or generating other graphic objects, the user creates a gesture, step 402. The system then examines the graphic objects positioned near the gesture, step 403. A specific check is made to see if one of the graphic objects is a closed curve, step 404. In the currently preferred embodiment this is accomplished by checking the shapes of the graphic objects. However, it would be apparent to one of skill in the art to use other techniques, e.g. attaching a flag to the graphic object to indicate that it is a closed curve. In any event, if no graphic object is a closed curve, then the gesture is interpreted as a non-enclosure operation, step 408.

If one of the graphic objects is a closed curve, the system then identifies the gesture type, step 405. The gesture type may typically be identified by the shape and position of the pen stroke used to create the gesture. A determination is then made to determine whether the gesture operation is valid on enclosures, step 406. If not, the gesture is interpreted as a non-enclosure operation per step 408. If the gesture is determined to be one that is valid for operations on enclosures, then the closed curve is treated as an enclosure and the corresponding enclosure operation is performed, step 407. The various enclosure operations invoked by gestures are described below.

Graphic objects can be added or removed from a group by re-shaping its enclosure or by fusing enclosures. A group may be collapsed and represented by surrogate graphic objects called container icons (akin to a footnote). Other features and advantages of the currently preferred embodiment will become apparent in the foregoing description.

Enclosures

An important concept of the present invention is the notion of an enclosure as a persistent graphic object. To contrast with the prior art, a selection enclosure is an ephemeral graphic object that only exists while a selection operation is being performed. In order to manipulate multiple graphic objects with a single operation, each of the graphic objects must be "selected" as a group. It is often desirable to group a set of graphic objects so that the selection of the graphic objects is persistent. As described in the prior art, known techniques for modifying the contents of a group are awkward.

Enclosures as a persistent graphic object have the following characteristics:

- They are typically an ink stroke, but may be any graphic object which defines a fixed region and its border (e.g. a highlighted area).
- When an ink stroke, they are loop-shaped strokes wherein the beginning of the stroke is "close" to the end of the stroke. The ink stroke may also be a rectangle created using a rectangle generation operation found on many graphical user interfaces.
- The interior of the enclosure defines a fixed region. So for example, each region can hold a list of items (represented by graphic objects).
- Selecting the enclosure selects the group, i.e. the enclosure and the graphic objects within the region defined by the enclosure.
- Enclosures may be erased without deleting the associated collection of graphic objects, i.e. enclosures are just like any other ink stroke.
- Graphic objects may be selected and moved into or out of the region defined by the enclosure.

Operations On Enclosures

Figure 5:
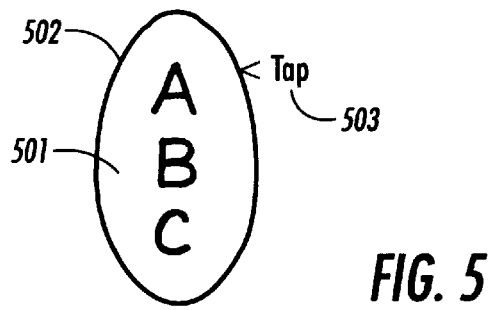
FIGS. 5–6 illustrate selection of an enclosure as may be performed in the currently preferred embodiment of the present invention.
Figure 6:
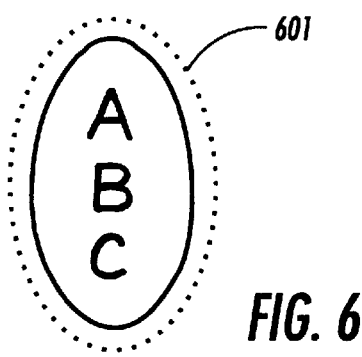

Since they are graphic objects, any operation that can be performed on a graphic object can be performed on an enclosure, e.g. erase, "wiping" a change of color or thickness, etc.. Any operation performed the enclosure will have the same effect on the group. To operate on the group, generally, the first step that must be performed is to select the enclosure. Selection is illustrated with respect to FIGS. 5–6. FIG. 5 illustrates graphic objects represented by "A B C" 501 that are enclosed by enclosure 502. To be recognized as an enclosure, the endpoints of the enclosure must be sufficiently close. This sufficient closeness will depend on such parameters as the resolution of the display area and the thickness of the stroke. Selection of the graphic objects 501 and enclosure 502 is indicated by the "tap" gesture 503 on the enclosure 502. Referring now to FIG. 6, the enclosure 502 has been selected along with the enclosed graphic objects 501. This is illustrated by the display of selection loop 601. Further, the enclosure 502 and graphic objects 501 now constitute a group. In the currently preferred embodiment selection is accomplished by a tap gesture on the enclosure, however techniques for selection (e.g. other types of gestures) may be used.

Once a group is selected other operations may be performed which will affect the entire group. The group may be moved (e.g. by dragging or wedge-right (>) gesture) or copied (e.g. by wedge-left (<) gesture), the color changed, the group shrunk or expanded. Other operations affecting the contents of selected enclosures are described below.

Altering Enclosures

Changing the contents of an enclosure may be accomplished by simply moving objects into or out of the enclosure, erasing objects, etc. As described above, a user may also alter an enclosure to change its shape. Changing an enclosure's shape provides a convenient technique for a user to add or remove graphic objects. A user may add graphic objects to a group by altering the enclosure so that it includes other graphic objects, or by enlarging the enclosure so that graphic objects may be moved into the enclosure or new graphic objects may be created within the enclosure. A user may remove graphic objects from a group by reshaping the enclosure so that the graphic objects to be removed are no longer within the region defined by the enclosure.

An alteration gesture is created by a pen stroke wherein the endpoints touch two points of the enclosure. Generally, the system detects the pen stroke and that it has touched two points of a closed curve (i.e. an enclosure). The pen stroked is then treated as an enclosure gesture which alters the shape of the closed curve based on where the pen stroke touched the enclosure.

Figure 7:
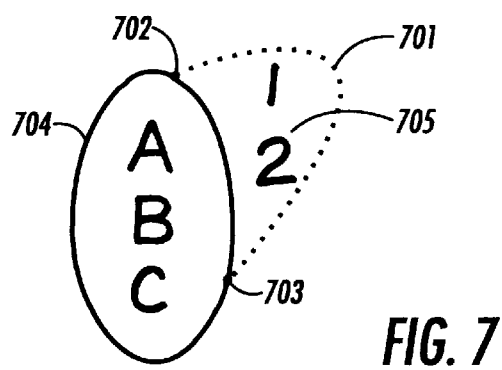
FIGS. 7–8 illustrate alteration of an enclosure to add graphic objects to the enclosure as may be performed in the currently preferred embodiment of the present invention.
Figure 8:
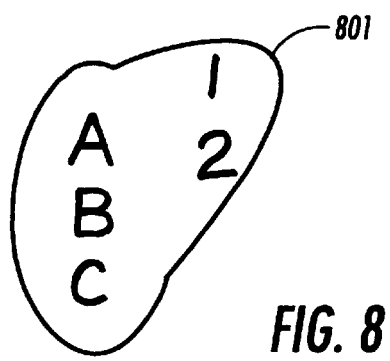

Adding graphic objects to an enclosure is illustrated in FIGS. 7–8. Referring to FIG. 7 a pen stroke 701 touches enclosure 704 at a first point 702 and at a second point 703. This causes the pen stroke 701 to be treated as an alteration gesture so that the enclosure 704 is to be altered accordingly. In FIG. 7, the graphic objects "1 2" 705 are to be added to the group. Referring now to FIG. 8, when completed an enclosure 801 has been created which has the shape of the original enclosure 704 with the shape of the pen stroke 701 added as a "bump".

Figure 9:
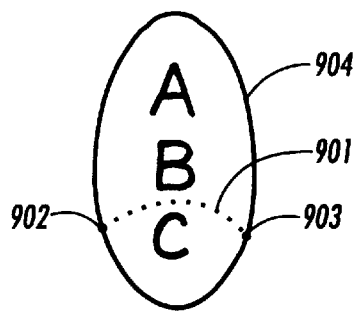
FIGS. 9–10 illustrate alteration of an enclosure to remove graphic objects from the enclosure as may be performed in the currently preferred embodiment of the present invention.
Figure 10:
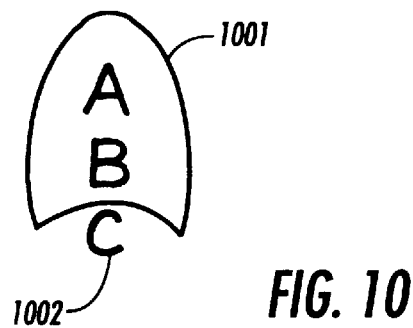

FIGS. 9–10 illustrates alteration of an enclosure to remove graphic objects. Referring to FIG. 9, a pen stroke 901 touches enclosure 904 at a first point 902 and at a second point 903. As above, this causes the pen stroke 901 to be treated as an alteration gesture. However, here it is determined that the pen stroke is within the region defined by enclosure 904 so the alteration is one that "cuts-out" a portion of the region. Referring now to FIG. 10, this results in a new enclosure 1001 takes a shape removing a portion corresponding to the pen stroke 901. This has effectively removed the graphic object 1002, i.e. the letter "C" from the group.

For an alteration gesture which removes graphic objects a determination must be made as to what is part of the enclosure is to be "cut-out". The currently preferred embodiment operates on the heuristic that the "largest" portion of the enclosure is the one to be retained.

Splitting an Enclosure

Splitting an enclosure creates two new enclosures and removes the original enclosure. For example, when manipulating a list, it may be determined that it would be more appropriate to manipulate only sub-lists of the list. The splitting gesture is caused by pen stroke created by a back and forth motion. The pen stroke will have been at least in part contained in the region defined by the enclosure to be split. The splitting gesture operates such that it spatially detects the enclosures that it will be operating on and the location of the gesture indicates the splitting location.

Figure 11:
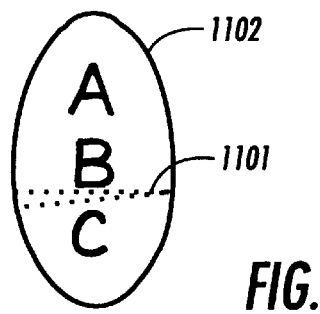
FIGS. 11–12 illustrate splitting an enclosure using a back and forth gesture as may be performed in the currently preferred embodiment of the present invention.
Figure 12:
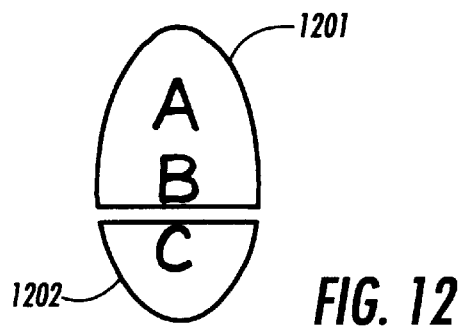

FIGS. 11–12 illustrate splitting an enclosure using a splitting gesture to create two enclosures from the single enclosures. Referring to FIG. 11, a splitting gesture 1101 is drawn which is within the region defined by the enclosure 1102. The splitting gesture causes the enclosure 1101 to be split approximately at the point where the gesture occurred. This is illustrated in FIG. 12 by the enclosures 1201 and 1202.

Figure 13:
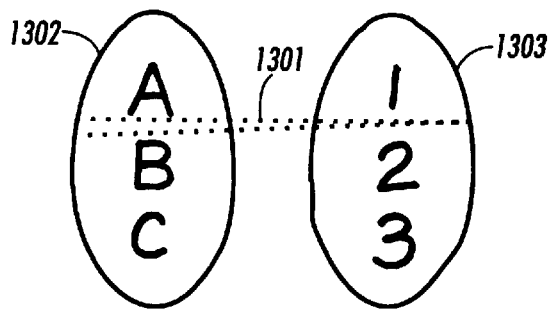
FIGS. 13–14 illustrate splitting multiple enclosures using a back and forth gesture as may be performed in the currently preferred embodiment of the present invention.
Figure 14:
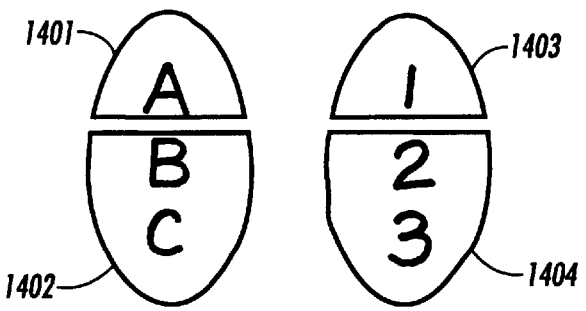

FIGS. 13–14 illustrate that the splitting gesture can be performed across multiple enclosures resulting in the splitting of both enclosures. So referring to FIG. 13, splitting gesture 1301 crosses enclosures 1302 and 1303. Referring now to FIG. 14, the enclosures 1401 and 1402 are created from the enclosure 1302 and the enclosures 1403 and 1404 are created from enclosure 1303.

Fusing Enclosures

Figure 15:
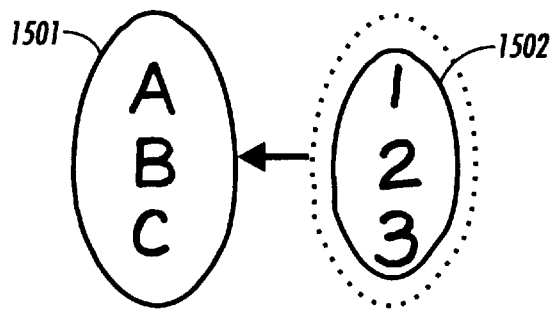
FIGS. 15–17 illustrate implicit fusing by moving a first enclosure to overlap a second enclosure, as may be performed in the currently preferred embodiment of the present invention.
Figure 16:
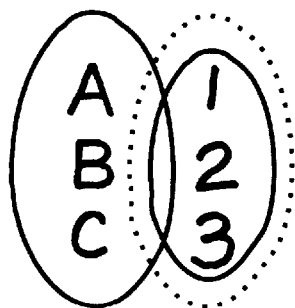
Figure 17:
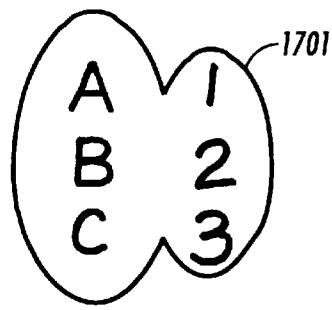

Fusing enclosures causes the contents of the fused enclosures to be combined under a single enclosure. The fusion may be implemented so that it is implicit or explicit. FIGS. 15–17 illustrate an example of implicit fusing. Referring to FIG. 15 a selected enclosure 1502 is moved so that it overlaps with an enclosure 1501. The result of the move is illustrated in FIG. 16. The fusing is illustrated in FIG. 17 where the contents of each of enclosures 1501 and 1502 are in the region of new enclosure 1701. The shape of enclosure 1701 corresponds to the boundary of the overlapped enclosures 1501 and 1502.

However, implicit fusing can cause undesired results. For example, while moving enclosures, one may be accidentally placed so that it overlaps another. This would cause them to be accidentally fused and would require the enclosures to be split apart. Moreover, for some uses of a graphical user interface it is desirable to have closed curves which overlap, e.g. drawing Venn Diagrams. So explicit fusing is provided as the default in the currently preferred embodiment. In explicit fusing a fusing gesture, here a pen stroke in the shape of a closed curve in particular positions, is used to fuse enclosures. The fusing operation will be performed on each of the enclosures that the fusing gestures touches.

Figure 18:
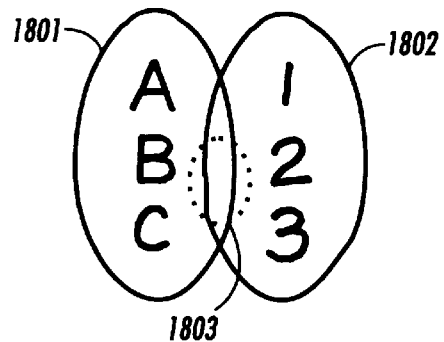
FIGS. 18–19 illustrate explicit fusing using a fusion gesture when a first enclosure overlaps a second enclosure, as may be performed in the currently preferred embodiment of the present invention.
Figure 19:
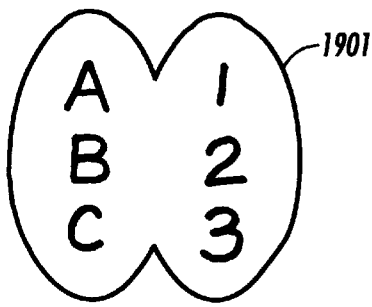

FIGS. 18–19 illustrate a simple example of explicit fusing when enclosures overlap. Referring to FIG. 18, enclosures 1801 and 1802 overlap. The fusing loop gesture 1803 is then performed. The result is illustrated in FIG. 19 where the contents of each of enclosures 1801 and 1802 are in the region of new enclosures 1901. The shape of enclosure 1901 corresponds to the boundary of the overlapped enclosures 1801 and 1802.

Figure 20:
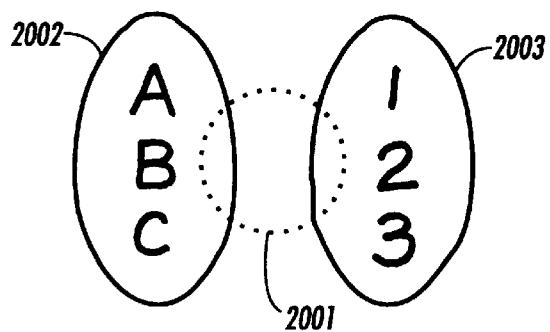
FIGS. 20–21 illustrate explicit fusing by using a fusion gesture across the enclosures to be fused, as may be performed in the currently preferred embodiment of the present invention.
Figure 21:
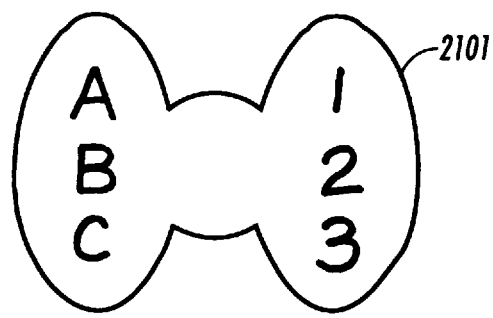

FIGS. 20–21 further illustrates explicit fusing using the fusing gesture. Referring to FIG. 20, the enclosures 2002 and 2003 do not overlap. A fusing gesture 2001 touches the boundaries of both enclosures 2002 and 2003. This results in the enclosure 2101 of FIG. 21. The shape of the resulting enclosure 2101 takes on the shape of the fusion gesture 2001 as if it were connecting the enclosures 2002 and 2003.

A further means for fusing enclosures is described below with reference to Links between enclosures.

Links

Links are ink strokes that are used to provide a visual connection between one or more enclosures. Links have the following characteristics:

Links are associated with at least one enclosure (i.e. one-ended) and at most two enclosures. To be associated with an enclosure a link end point must "touch" the enclosure.

An enclosure may have multiple links.

Selecting an enclosure highlights its links.

Links are free form, i.e. can be any shape.

Links associated with an enclosure are persistent so that they will reshape to maintain contact when the enclosure is moved/enlarged/or shrunk, i.e. the connections between enclosures provided by the links are always preserved.

Links may altered by selecting and moving the link endpoints.

Figure 22:
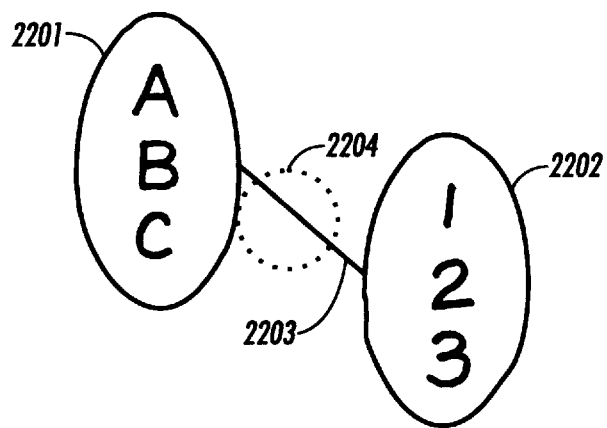
FIGS. 22–23 illustrate explicit fusing by performing a fusion gesture on a link between the enclosures to be fused, as may be performed in the currently preferred embodiment of the present invention.
Figure 23:
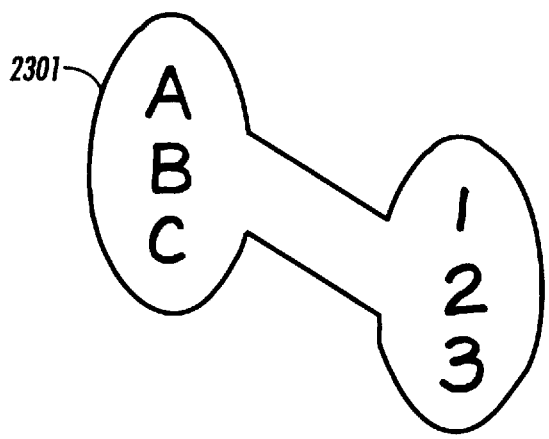

One manner in which links may be used is for fusing enclosures. Explicit fusion is accomplished by performing a fusing gesture so that it touches a link. This is illustrated in FIGS. 22–23. Referring to FIG. 22, enclosures 2201 and 2202 are linked by link 2203. A fusing gesture 2204 is performed which touches the link 2203. The result is the enclosure 2301 of FIG. 23. The shape of the enclosure 2301 is one that connects the two enclosures along the link. After the enclosures have been fused, the link 2203 is removed.

Figure 24:
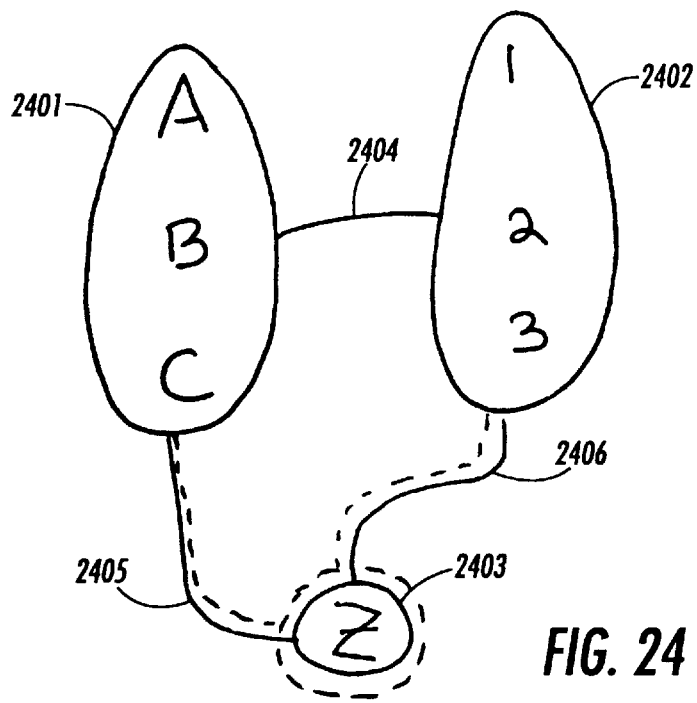
FIGS. 24–25 illustrate selecting of enclosures and corresponding links as well as reshaping links when enclosures are moved, as may be performed in the currently preferred embodiment of the present invention.
Figure 25:
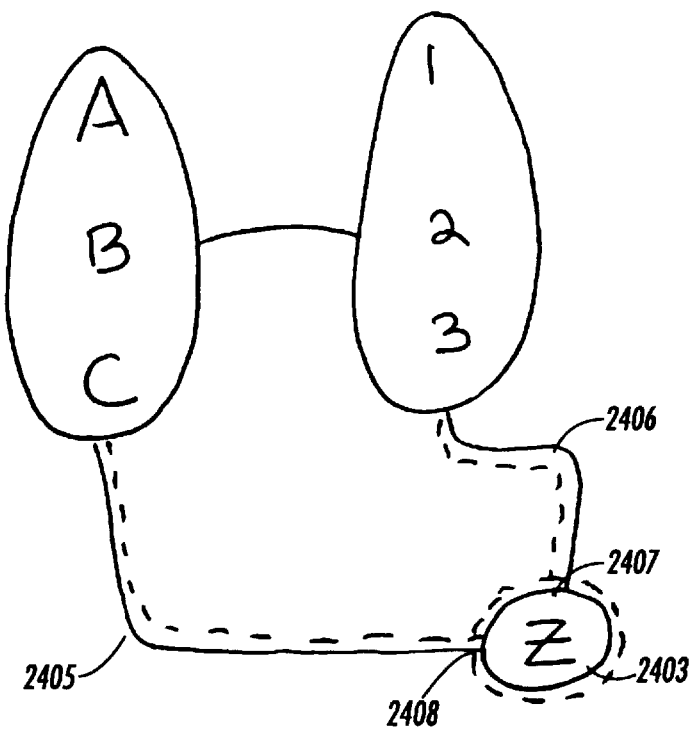

FIGS. 24–25 illustrate the selecting of enclosures and associated links and the reshaping of links when an enclosure is moved. Referring to FIG. 24, enclosure 2401 is linked to enclosure 2402 via link 2404 and to enclosure 2403 via link 2405. Enclosures 2402 and 2403 are linked via link 2406. Enclosure 2403 is selected which causes links 2405 and 2406 to also be selected. This is illustrated by the dashed outline of enclosure 2403 and links 2405 and 2406. In FIG. 25 enclosure 2403 has been moved which causes links 2405 and 2406 to be reshaped. It should be noted that while clearly reshaped, link 2406 has maintained its basic shape characteristics This is accomplished by a reshaping technique which uses the static endpoint of a link as an anchor position and scales and/or flips the reshaped link depending on where the enclosure is moved. Finally, it should be noted that the endpoints 2407 and 2408 of the respective links maintain their position on the enclosure 2403 as the enclosure is moved.

Figure 26:
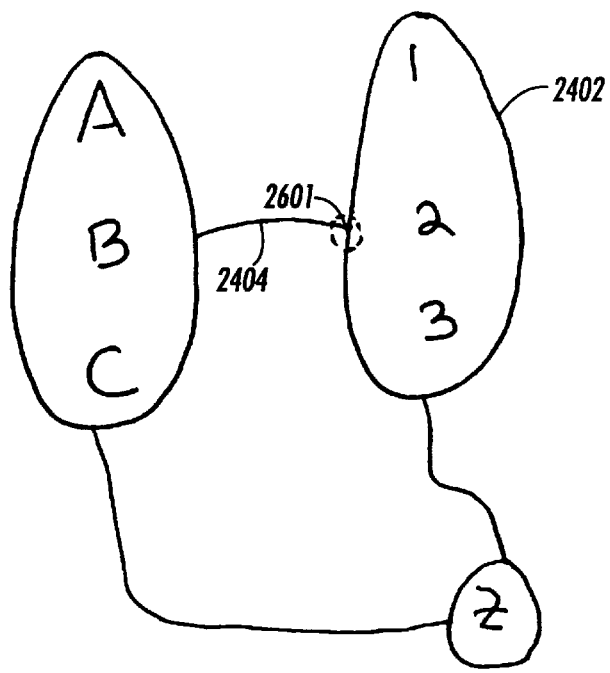
FIGS. 26–27 illustrates selecting a link endpoint on one enclosure and moving to another enclosure, as may be performed in the currently preferred embodiment of the present invention.
Figure 27:
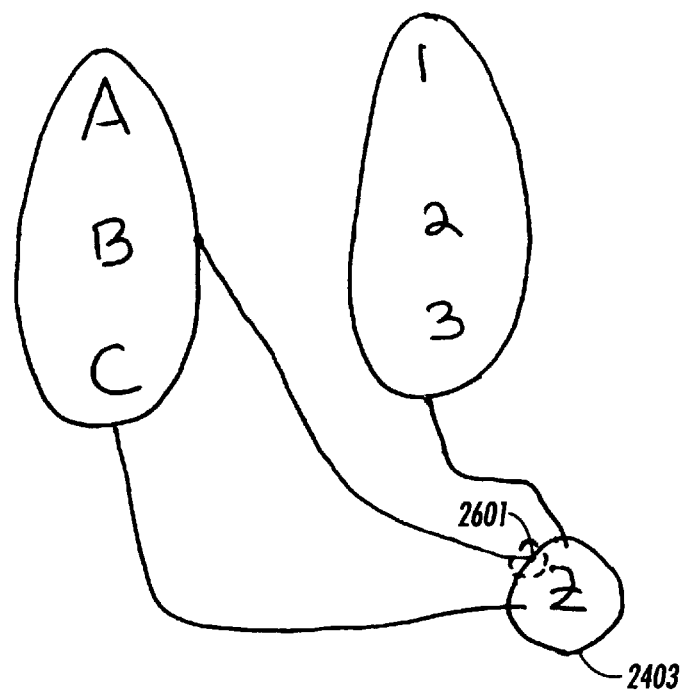

FIGS. 26–27 illustrate the selection and movement of link endpoints. Movement of link endpoints is desirable when a figure needs to be rearranged or otherwise changed. Referring to FIG. 26, endpoint 2601 of link 2404 has been selected. The endpoint 2601 here lies on enclosure 2402. Selection of a link endpoint is indicated by the dashed circle about the endpoint. Once selected the endpoint may be moved. The result of such movement is illustrated in FIG. 27. Referring to FIG. 27, the endpoint 2601 has been moved to the enclosure 2403.

Providing links between enclosures is useful, particularly when repositioning the enclosures. Being able to retain the visual association between the enclosures even as they are moved helps provide unencumbered usage of the graphics based system.

Detaching a link from an enclosure may be accomplished in one of two ways. First, the enclosure may be altered so that it no longer "touches" the endpoint of the link. Alternatively, the endpoint of the link may be selected and moved so that it no longer touches the enclosure. Detaching of a link may be useful when the heuristic for maintaining persistence causes undesirable results such as the link crossing through the enclosure.

A link may also be attached to an enclosure using similar techniques. First, the enclosure may be altered so that it "touches" the endpoint of the link. Second the endpoint of the link may be selected and moved so that it touches the enclosure.

Thus, an improved system for manipulating graphic objects in a graphics based computer system has been disclosed. While the present invention is described with respect to a preferred embodiment, it would be apparent to one skilled in the art to practice the present invention in alternative embodiments supporting gesture based input. Such alternate embodiments would not cause departure from the spirit and scope of the present invention.

We claim:

1. A method for creating and manipulating groups of graphic objects in a computer-controlled graphics editing system, said method comprising the steps of:
   a) a user drawing a persistant first enclosure graphic object, said first enclosure graphic object defining a boundary for a region wherein a first set of one or more graphic objects are positioned;
   b) said user acting on said first enclosure graphic object; and
   c) said system detecting that said first enclosure graphic object has been acted on and causing said first enclosure graphic object and said first set of one or more graphic objects to also be selected and grouped.

2. The method as recited in claim 1 wherein prior to said step of said user acting on said first enclosure graphic object, performing the steps of:
   said user performing an alteration action for altering said boundary of said first enclosure graphic object, said alteration action one of a set of alteration gestures; and
   said system altering said boundary of said first enclosure graphic object based on said alteration gesture, and wherein said first set of one or more graphic objects may change.

3. The method as recited in claim 2 wherein said alteration action is modification gesture that increases the size of the defined region of said first enclosure graphic object so that one or more new graphic objects are in said first set of one or more graphic objects.

4. The method as recited in claim 2 wherein said alteration action is a modification gesture that causes the size of the defined region of said enclosure to decrease so that at least one graphic object of said set of one or more graphic objects is now outside said boundary.

5. The method as recited in claim 2 wherein said alteration action is a splitting gesture for splitting said first graphic object enclosure into a second graphic object enclosure and a third graphic object enclosure based on the spatial position of said splitting gesture.

6. The method as recited in claim 1 further comprising the step of moving said first graphic object enclosure and wherein said first group of graphic objects are moved in unison.

7. The method as recited in claim 6 wherein said first graphic object enclosure is moved to overlay a second graphic object enclosure, said second graphic enclosure graphic object defining a boundary for a region where a second set of one or more graphic objects are positioned; and said system performing the step of implicitly fusing said first graphic object enclosure and said second graphic object enclosure.

8. The method as recited in claim 7 where said step of said system implicitly fusing said first graphic object enclosure and said second graphic object enclosure is further comprised of the steps of:
   removing said first graphic object enclosure and said second graphic object enclosure;
   creating a third graphic object enclosure that has a shape representing said first graphic object enclosure overlaying said second graphic object enclosure so that said first group of graphic objects and said second group of graphic objects are fused to created a third group of graphic objects.

9. A method for manipulating groups of graphic objects in a computer-controlled graphics editing system, said method comprising the steps of:
   a) a user drawing a first enclosure graphic object around a first set of graphic objects;
   b) said user drawing a second enclosure graphic object around a second set of graphic objects;
   c) said user performing a fusion gesture to fuse said first enclosure and said second enclosure;
   d) said system fusing said first enclosure and said second enclosure to create a fused enclosure having a shape corresponding to said first enclosure connected to said second enclosure and said fusion gesture, and said fused enclosure defining an area containing said first set of graphic objects and said second set of graphic objects.

10. The method as recited in claim 9 wherein said fusion gesture is a loop shaped gesture and said fused enclosure has a shape of said first enclosure connected to said second enclosure via a linear section.

11. The method as recited in claim 9 wherein said fusion gesture is an arbitrarily connected shape overlapping said first enclosure and said second enclosure and said fused enclosure has a shape of said arbitrarily connected shape overlapping said first enclosure and said second enclosure.

12. The method as recited in claim 9 wherein prior to said step of performing a fusion gesture, performing the steps of:

selecting said first enclosure using a selection gesture, said selecting step further causing said one or more other graphic objects to be grouped; and dragging said first enclosure so that it overlaps said second enclosure.

13. The method as recited in claim 9 wherein prior to said step of said user performing a fusion gesture, said user performing the step of drawing a link graphic object between said first enclosure graphic object and said second enclosure graphic object.

14. The method as recited in claim 13 wherein said fusion gesture is a looped shaped gesture across said link graphic object and said fused enclosure has a shape of said first enclosure connected to said second enclosure across said link graphic object.

15. A computer controlled graphics display system including a display and user controllable means for generating graphic objects, said system further comprising:

enclosure detection circuitry, said enclosure detection circuitry for identifying a graphic object as an enclosure, said enclosure defining a region;

group detection circuitry for identifying a group of graphic objects in said region, wherein operations performed on said graphic objected identified as an enclosure will also be performed on said group of graphic objects in said region;

position detection circuitry for detecting a position of a gesture;

gesture interpretation circuitry for identifying said gesture as being one of an associated plurality of gesture types and performing an enclosure operation corresponding to said identified gesture type on said enclosure.

16. The system as recited in claim 15 wherein one of said associated plurality of gesture types is an alteration gesture for changing the shape of an enclosure.

17. The system as recited in claim 15 wherein one of said associated plurality of said gesture types is a fusion gesture for fusing two enclosures to create a single enclosure.

18. The system as recited in claim 15 wherein said one of said associated plurality of gesture types is a splitting gesture for splitting an enclosure into two enclosures.

* * * * *